Jan. 13, 1942.          J. GREEN                2,270,119
                    TIRE BUFFING MACHINE
                    Filed May 19, 1939         2 Sheets-Sheet 1

Inventor
JACK GREEN
By
Attorney

Jan. 13, 1942. J. GREEN 2,270,119
TIRE BUFFING MACHINE
Filed May 19, 1939 2 Sheets-Sheet 2
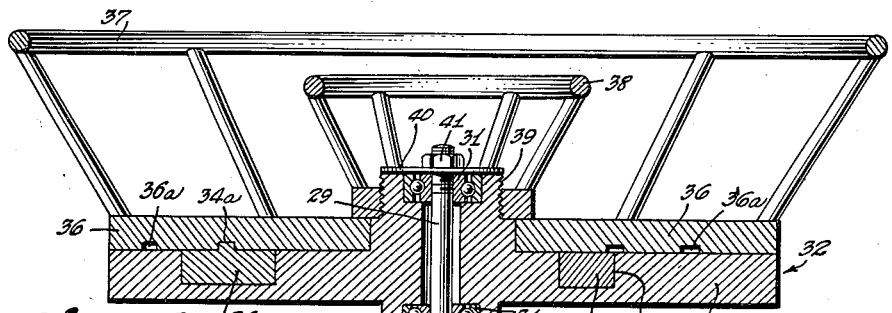
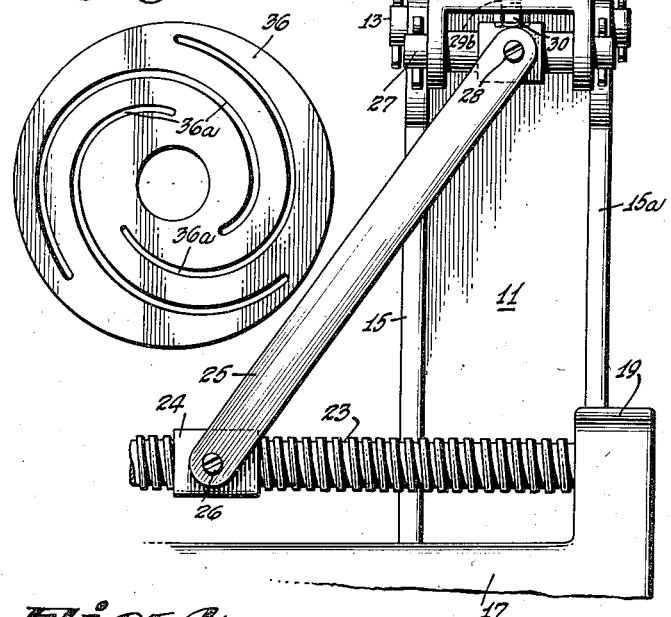
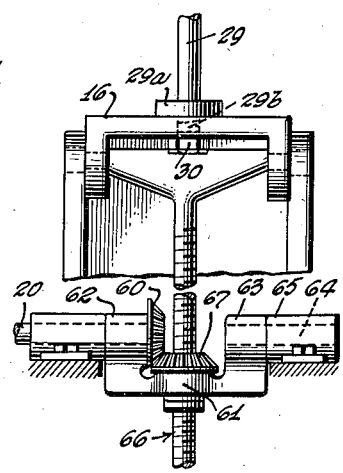
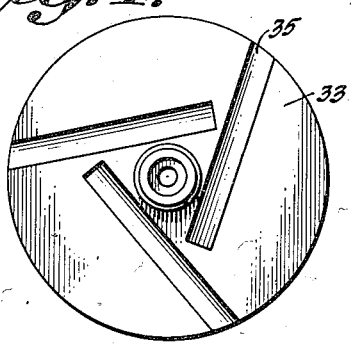
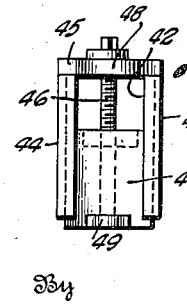
Inventor
JACK GREEN Patented Jan. 13, 1942

2,270,119

UNITED STATES PATENT OFFICE 2,270,119

TIRE BUFFING MACHINE

Jack Green, Norfolk, Va.

Application May 19, 1939, Serial No. 274,644

4 Claims. (Cl. 51—94)

This invention relates to a tire buffing machine and contemplates improvements in the mechanism for handling the tire during the buffing operation and to facilitate the buffing of the complete tread portion of the tire.

Another object is to improve the efficiency of machines of this character by simplifying the structure thereof and by arranging the control mechanism within easy reach of the operator. A further object is to provide means for obtaining a fine and accurate adjustment of the tire with respect to the abrading or buffing element so as to enable the operator, with a minimum of manual effort and attention, to trim the entire tread surface of the tire and such side wall portions thereof as may be desired. Still a further object is to provide such a machine which is of sturdy structure and compact in design, and which will occupy a minimum amount of space.

The invention comprises a machine having a bed with a buffing wheel adjacent one end thereof and having the tire supported upon a longitudinally movable carriage so that the tire may be manipulated with respect to the buffing head. This carriage embodies means for supporting the tire longitudinally thereon in such a manner that the tire may be swung about a horizontal plane at the will of the operator, and presented to the buffing or abrading wheel at any suitable angle with a minimum of effort.

For a more complete understanding of this invention, reference is made to the accompanying drawings, in which like references refer to like parts in all the figures.

In these drawings:

Figure 3 is an enlarged detail view taken along the line 3—3 of Figure 1;

Figure 4 is a plan view of the bottom portion of the tire clamping means;

Figure 5 is a plan view of the bottom face of the upper portion of the tire clamping means;

Figure 6 is an enlarged detail of the tire gripping means, and

Figure 7 is a detail, showing a modified form of the mechanism shown in Figure 3 for swinging the tire.

Figure 1:
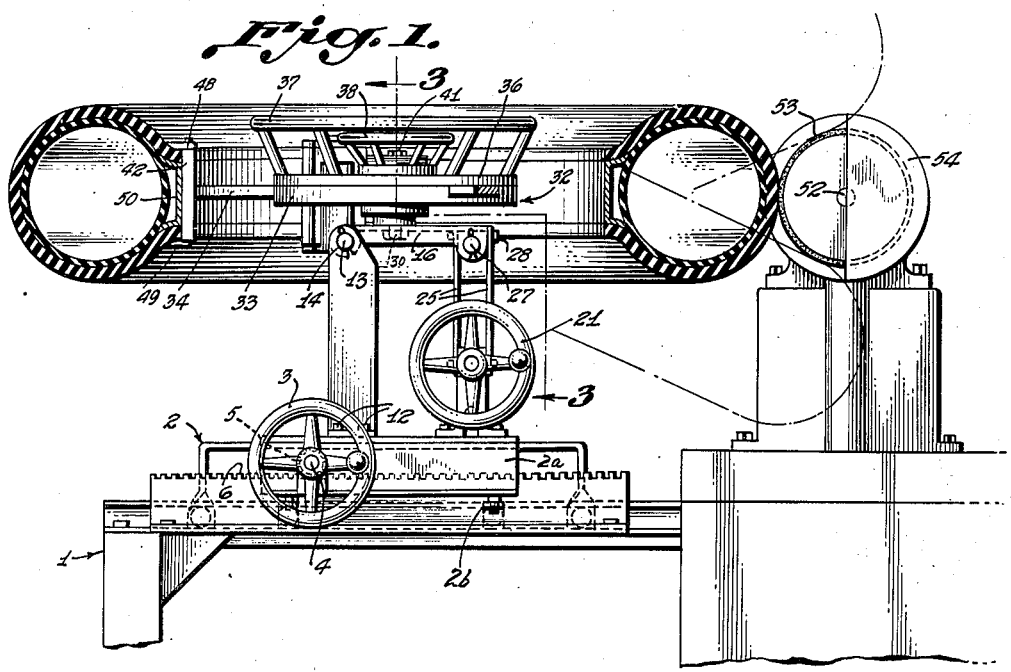
Figure 1 is a front elevation of the machine with parts shown in section.
Figure 2:
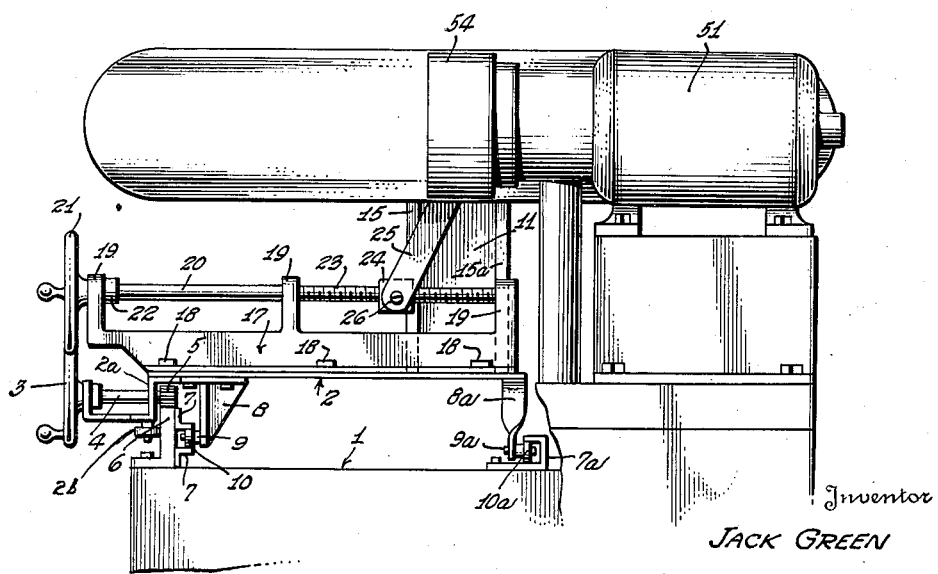
Figure 2 is an end elevation of the machine.

The machine embodies a carriage 2 movable on a trackway resting on a suitable supporting surface 1. This carriage is operated by means of a hand wheel 3 mounted on a shaft 4 which carries a gear 5 meshing with a rack 6 fixed to the front part of the bed of the machine. The rear face of this rack carries a pair of spaced angle irons 7 forming a roller trackway. These angle irons may be welded or otherwise secured to the rack 6. A bracket 8 is fixed to the underside of the carriage adjacent the rack and is spaced therefrom. This bracket carries a stub shaft 9 upon which a roller 10 is mounted, the roller 10 riding in the trackway provided between the spaced angle irons 7 which are secured to the rack as above described. The carriage has an apron 2a extending over the front face of the rack 6, and supports rollers 2b which engage the front face of the rack. The rear portion of the carriage is supported by means of a downwardly projecting bracket 8a which carries a stub shaft 9a, and a roller 10a which rides in a channel member 7a which is fixed to provide a trackway on the rear portion of the bed 1.

The carriage 2 supports a vertically arranged channel-shaped standard 11 which is arranged substantially centrally on the carriage and is suitably secured thereto by means of bolts 12. The upper end of this channel-shaped standard is cut away and rounded as shown, and carries a hinge pin 13 which is mounted for movement in the bearing holes 14 of the parallel flanges 15, 15a, which serve as bearing supports for said hinge pin 13. A channel shaped work supporting table 16 is pivotally secured at one end to said hinge pin 13. The other end of said supporting table 16 is pivotally secured to a means for raising and lowering the same, so as to swing it on an axis about the hinge pin 13. These means comprise a bracket 17 bolted to the carriage 2 by means of bolts 18. The bracket 17 has upwardly projecting shaft bearing supports 19 in which a shaft 20 is mounted for rotation. The shaft 20 carries a hand wheel 21 keyed thereto at its forward end and the shaft is secured against longitudinal movement with respect to the supports 19 by means of a locking collar 22. For the latter portion of its length, the shaft is threaded as at 23, and carries a traveling nut 24. A pair of links 25 are pivotally secured to the traveling nut, one link on each side thereof, by means of screws 26, and these links extend upwardly and are pivotally engaged with the free end of the work supporting table 16 by means of pin 27 and screws 28. The supporting table 16 has a shaft 29 extending vertically therefrom and the shaft is provided with a shoulder 29a and a threaded stub 29b, which projects through the table 16 and is secured thereto by means of a nut 30 on the under side thereof.

In the modified form of the detail shown in

Figure 7, the bracket 17 supports a shaft 20 which carries a bevel gear 60. A yoke 61 is supported adjacent the rearmost end of the bracket 17, one arm 62 of the yoke being carried by the shaft 20, the other arm 63 thereof being carried by the stub shaft 64 which in turn is supported by bearing bracket 65 mounted on the carriage 2. A screw 66 is pivotally connected to the free end of the table 16, and the screw carries an internally threaded bevel gear 67 which rests on the base of the yoke 61. The gear meshes with the gear 60 in such manner that the rotation of the latter gear actuates the former which in turn causes the screw 66 to move up or down, according to the direction of rotation of the hand wheel 21, thereby imparting vertical movement to the free end of the table 16, as will well be understood by those skilled in the art.

It will be seen that by reason of the construction described, the entire carriage 2, with brackets 17 and 20, rack 6, together with front and rear trackways 7, 7a, may be installed as a unit upon any suitable support, and this compactness and portability in a machine of this character is very desirable both from a practical and commercial standpoint, and forms an important part of this invention. The gear 5, in engagement with the teeth of rack 6, and the bracket 8, with roller 10 mounted between the rails of track 7, apron 2a and roller 2b, help support said rack in combination with the carriage. The other rail 7a of the trackway is carried by bracket 8a and roller 10a, as above described.

A tire clamping device is supported on the shaft 29 by means of bearings 31, and this unit forms a turntable 32. The turntable comprises a lower plate 33, which forms a support for tire-engaging arms 34 which are suitably actuated so as to slide in the grooves 35 formed in the plate 33. A securing plate 36 having a hand gripping wheel 37 is arranged to rest on the plate 33 so as to lock the clamping arms 34 between the plates 36 and 33. The arms 34 have lugs 34a which ride in spiral grooves 36a of securing plate 36. The rotation of the hand wheel 37, therefore, will cause the arms 34 to be projected outwardly so as to grip a tire, and a reverse rotation of this wheel will retract said arms in a manner which will be apparent from the construction. A clamping wheel 38 is threadedly secured on a correspondingly threaded portion 39 of the turntable 32 in such a manner as to lock the plate 36 with respect to the plate 33. A locking washer or plate 40 is mounted over the end of the shaft 29 and turntable, and over this is placed a nut 41 which secures the entire tire turntable unit for rotational movement on the shaft 29.

The arms 34 are provided at their free ends with means for clamping the rim flanges of the tire. These means comprise a channel-shaped member 42 having a nut 43 mounted for vertical travel between the ways 44. A plate 45 is seated on the upper end of this channel and a screw 46 having a wrench-engaging head is swiveled in said plate 45. A lug 48 is provided at the upper end of said device and another lug 49 is integrally formed with the traveling nut 43.

When it is desired to mount a tire for trimming on said machine, a tube is first inserted in the tire and it is slightly inflated. A flexible metal insert or flap 50 is placed adjacent the tube between the inner walls of the tire flanges so as to form a supporting surface against which the tire-engaging lugs 48, 49 may secure a clamping hold on said tire flanges.

The tire buffing means comprises a motor 51 having a shaft 52 upon which is mounted an abrading head or rasp 53.

In the operation of the machine, a tire is lightly inflated as outlined above, and is mounted on the arms 34 for rotation around the axis of the shaft 29. The hand wheel 3 is then operated to bring the tire into engagement with the abrading element or rasp 53. The tire may be initially spun manually by the operator to start it in motion as the tread surface is presented to the rotating abrading element and the rotation thereof will be continued as long as it is in contact with said abrading element, which tends to keep the tire rotating. It is understood that the peripheral tire tread surface, and such portions of the side walls of the tire as are desirable, may be removed or roughened by contact with the abrading wheel. The various portions of the tread and side wall surface are presented to the abrading wheel by manipulation of the hand wheel 21, which changes the angle of the tire. Rotation of this wheel imparts rotation to the shaft 20 and thereby causes the nut 24 to move forward or backward on the threaded portion 23 of the shaft according to the direction of rotation of hand wheel 21. This movement of the nut 24 changes the angle of the links 25 in such a manner as to raise or lower the supporting table 16 which carries the shaft 29 upon which the tire is mounted.

It is understood that while a preferred embodiment of the invention has been disclosed, changes may be made in the construction and arrangement of parts without departing from the spirit of the invention as defined by the appended claims.

I claim:

1. A tire buffing machine having a longitudinally movable carriage, a standard secured to said carriage, a work-supporting table pivoted at one end to said standard, means for clamping work to said table, and means for moving said table about its pivoted axis, said latter means comprising a bracket secured to said carriage, a shaft journalled in said bracket and a gear on said shaft, a second and threaded shaft extending at right angles to said first shaft, an internally threaded gear on said second shaft meshing with the gear on said first shaft, one end of said second shaft being pivotally secured to the free end of said table, and means for actuating said shafts to effect the angular adjustment of the work table with respect to said carriage.

2. A tire buffing machine having an abrading means and a carriage slidable with respect thereto, an upright standard on said carriage, a table pivoted at one end to said standard and adapted for vertically swinging movement about said pivot, a work support rotatable on said table, means for clamping work to said support, means on said carriage for swinging said table about its pivoted axis comprising a bracket immovably secured with respect to the upper surface of said carriage, a threaded shaft journalled in said bracket and disposed between said carriage and table, a link pivotally secured at one end to a traveling nut on said shaft, the other end of said link being pivotally secured to the free end of said table, whereby said table is swung about its pivoted axis upon rotation of said shaft.

3. A tire buffing machine having an abrading means and a carriage slidable with respect thereto, an upright standard on said carriage, a table pivoted at one end to said standard and adapted for vertically swinging movement about said pivot, a work support rotatable on said table, means for clamping work to said support, a bracket immovably secured to said carriage, a shaft journalled in said bracket, and means operatively connected at one end with said shaft and at the other end with the free end of said table for actuating said table about its pivoted axis when said shaft is rotated.

4. A tire buffing machine having a work carriage and a trackway therefor adapted to rest upon a base, a coacting rack and gear mechanism for actuating said carriage along said trackway, laterally spaced brackets secured to the underside of each side of said carriage adjacent the rails of the trackway, and at least one roller carried by each bracket, said rollers riding on said trackway, each track thereof having an upper and lower rail for engaging said rollers whereby when the machine is resting on a base, it rides on the lower rails, and when it is lifted from its base, the upper rails rest on the rollers, and form a unit with the machine, apart from the base.

JACK GREEN.